United States Patent
Kleinhans et al.

(10) Patent No.: US 7,399,248 B2
(45) Date of Patent: Jul. 15, 2008

(54) MOVING COIL ELECTRONIC LOCKING DIFFERENTIAL

(75) Inventors: Aaron Kleinhans, Sterling Heights, MI (US); Xiaohong Duan, Canton, MI (US); Zhesheng Li, Rochester, MI (US); Clive McKenzie, Plymouth, MI (US); Brian Andonian, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 250 days.

(21) Appl. No.: 11/438,510

(22) Filed: May 22, 2006

(65) Prior Publication Data

US 2007/0270275 A1 Nov. 22, 2007

(51) Int. Cl.
*F16H 48/20* (2006.01)

(52) U.S. Cl. .................. 475/236; 475/149; 475/150; 475/152; 475/153; 475/154; 475/157; 475/235

(58) Field of Classification Search .............. 475/230, 475/231, 234, 235, 236, 149, 150, 151, 152, 475/153, 154, 157
See application file for complete search history.

(56) References Cited

U.S. PATENT DOCUMENTS

| | | | |
|---|---|---|---|
| 4,265,143 A | 5/1981 | Goscenski, Jr. et al. | |
| 4,733,577 A | 3/1988 | Griesser et al. | |
| 5,030,181 A | 7/1991 | Keller | |
| 5,989,147 A | 11/1999 | Forrest et al. | |
| 6,019,694 A | 2/2000 | Forrest et al. | |
| 6,083,134 A | 7/2000 | Godlew | |
| 6,478,708 B2 * | 11/2002 | Krisher | 475/150 |
| 6,551,209 B2 | 4/2003 | Cheadle et al. | |
| 6,796,412 B2 | 9/2004 | Teraoka | |
| 6,958,030 B2 | 10/2005 | DeGowske | |
| 7,022,040 B2 | 4/2006 | DeGowske et al. | |
| 7,247,118 B2 * | 7/2007 | Haruki et al. | 475/231 |
| 7,264,568 B2 * | 9/2007 | Ludwig et al. | 475/233 |
| 7,264,569 B2 * | 9/2007 | Fox | 475/241 |
| 7,325,664 B2 * | 2/2008 | Fusegi | 192/84.92 |
| 2002/0155913 A1 | 10/2002 | Fusegi et al. | |
| 2004/0110594 A1 | 6/2004 | Goto | |
| 2004/0204282 A1 | 10/2004 | Green et al. | |

* cited by examiner

*Primary Examiner*—David D. Le
(74) *Attorney, Agent, or Firm*—David B. Kelley; MacMillan, Sobanski & Todd, LLC

(57) ABSTRACT

A differential mechanism for transmitting power from an input to an output includes a case containing a side gear, a locking member rotatably secured to the case and axially displaceable relative to the case. The locking member alternately engages the side gear to limit rotation of the side gear relative to the case, and disengages the side gear to permit rotation of the side gear relative to the case. An electromagnetic coil assembly is supported on the case for movement toward and away from the locking member. A first actuator including an electromagnetic coil is supported on the case for moving the locking member toward engagement with the side gear in response to energizing the coil. A second actuator urges the locking member away from engagement with the side gear.

15 Claims, 5 Drawing Sheets

MOVING COIL ELECTRONIC LOCKING DIFFERENTIAL

BACKGROUND OF THE INVENTION

The present invention relates generally to an apparatus for alternately releasing and holding a side gear of a differential assembly against rotation relative to a case. More particularly, the invention pertains to electromagnetic actuation of a device for releasing and holding the side gear.

It is conventional to employ a hydraulically actuated clutch to permit limited wheel slip at an axle, i.e., to produce a rotational speed difference between the driven wheels. U.S. Pat. No. 4,265,143 discloses a hydraulic limited slip differential mechanism for locking up the differential gear set. A latch mechanism includes a latch member having a pair of latch surfaces, a frame member and a weighted member, which is oppositely disposed from the latch member about the axis of rotation of the gear set. The weighted member moves the latch mechanism, in opposition to the biasing force of a spring, along a straight, generally diametric path, in response to increasing rotational speed of the differential mechanism. This movement causes the latch to disengage the flyweights and prevents rotation of the flyweight. The position and mode of operation of the weighted member is effective to reduce mismissed engagements of the actuating mechanism.

A purpose of a locking differential is to prevent relative rotation of one driven wheel with respect to another driven wheel. This is usually accomplished by locking one differential side gear to a differential case, thereby preventing rotation of the side gear with respect to the differential case, and preventing relative wheel speed differential on any one axle.

Electronically-actuated locking differentials are well known in the automotive driveline industry. For example, U.S. Pat. No. 6,083,143 discloses a locking differential mechanism that includes a side gear having a set of teeth, and a locking member, also having a set of teeth for engaging the teeth on the side gear. A ball ramp actuator located adjacent the locking member is integral with an inner actuating plate. An outer actuating plate is located outside the case, and a set of cam balls operable with the actuating plates to cause ramp-up and engagement of the gear. An electromagnetic coil assembly is located adjacent the ball ramp actuator, operates to retard rotation of the outer actuating plate and to produce ramp-up in response to an electrical input signal.

A locking differential can also be used as an inter-wheel differential or as a center differential in 4×4 and AWD vehicles. In this case, the axis of the differential assembly is parallel to the longitudinal axis of the vehicle. The center differential allows drive shaft speed differences between the front and rear axles. But there are some cases where it is desired to lock the front and rear axle drive shafts together such that a single rotation speed is reattained. This condition is known as a locked center differential.

SUMMARY OF THE INVENTION

The present invention concerns an apparatus for alternately releasing and holding the side gear of a differential mechanism against rotation relative to a differential case. The differential is actuated into engagement by energizing an electromagnetic coil, and disengagement occurs upon deenergizing the coil by a spring. The engagement mechanism is reliable and uncomplicated by ball-and-ramp or cam-and-ramp mechanisms as are employed in the prior art. The electromagnetic coil does not rotate; therefore, it can be connected by reliable, conventional electric connectors to an electric power source without employing brushes, a slip ring, or another such device as would be required to connect the source of electric power to a rotating coil.

A moving coil electronic locking differential according to this invention will operate reliably at all normal operating temperatures in a front or rear axle differential or in a center differential, such as those used in 4×4 and AWD vehicles.

A differential mechanism according to this invention transmits power from an input to an output. The differential mechanism includes a case containing a side gear, a locking member rotatably secured to the case and axially displaceable relative to the case. The locking member alternately engages the side gear to limit rotation of the side gear relative to the case, and disengages the side gear to permit rotation of the side gear relative to the case. An electromagnetic coil assembly is supported on the case for movement toward and away from the locking member. A first actuator including an electromagnetic coil is supported on the case for moving the locking member toward engagement with the side gear in response to energizing the coil. A second actuator urges the locking member away from engagement with the side gear.

The scope of applicability of the present invention will become apparent from the following detailed description, claims, and drawings. It should be understood, that the description and specific examples, although indicating preferred embodiments of the invention, are given by way of illustration only. Various changes and modifications to the described embodiments and examples within the spirit and scope of the invention will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
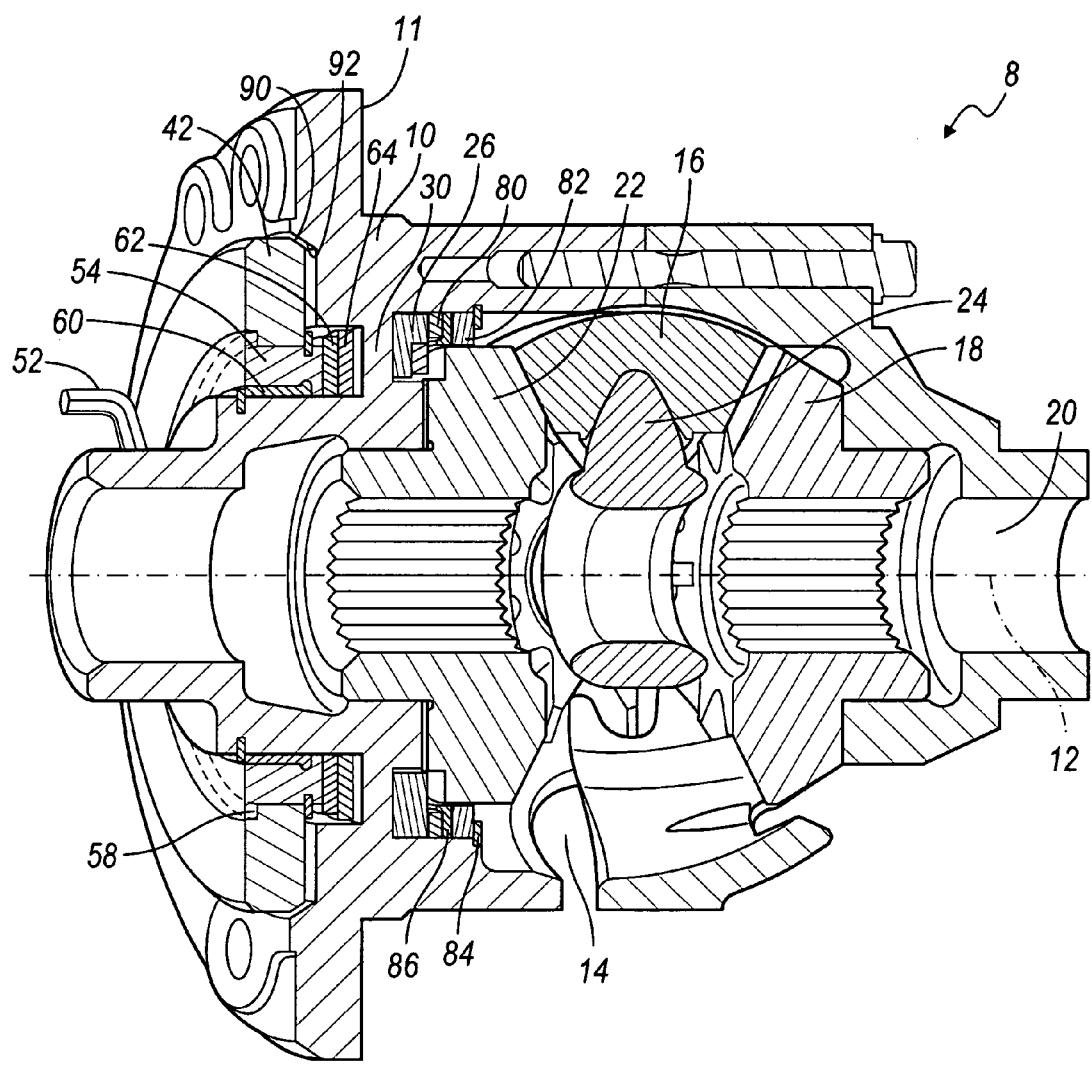
FIG. 1 is an isometric cross section of a differential mechanism according to the present invention.

Referring first to FIG. 1, a differential mechanism 8 according to this invention includes a differential case 10, preferably of cast iron or steel, supported on a stationary housing (not shown) for rotation about a lateral axis 12. A bevel ring gear, secured to the case at the attachment bore holes on the flange 11, drives the case 10 in rotation about axis 12 from an output of a transmission or transfer case.

The case 10 provides an internal chamber 14, which contains bevel pinions 16, a right side gear 18 meshing with the pinions and driveably connected to a right output shaft 20, which extends from the case 10 to a driven wheel of a motor vehicle, and a left side gear 22 meshing with the pinions and driveably connected to a left output shaft (not shown), which extends from the case to a driven wheel at the left side. The pinions 16 are each secured by pins 24 to the rotating case 10, such that the pinions 16 rotate about the axis of pins 24 perpendicular to axis 12, and the pinions and pins 24 rotate about axis 12.

Figure 2:
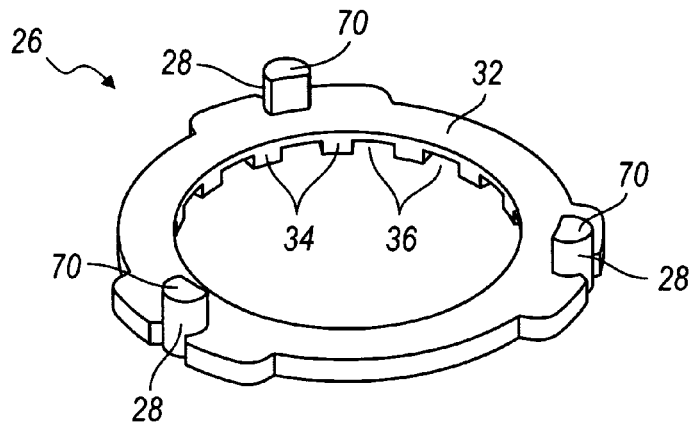
FIG. 2 is an isometric view of a locking ring.
Figure 3:
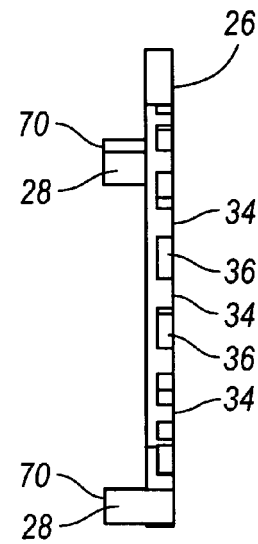
FIG. 3 is a side view of the locking ring of FIG. 2.
Figure 9:
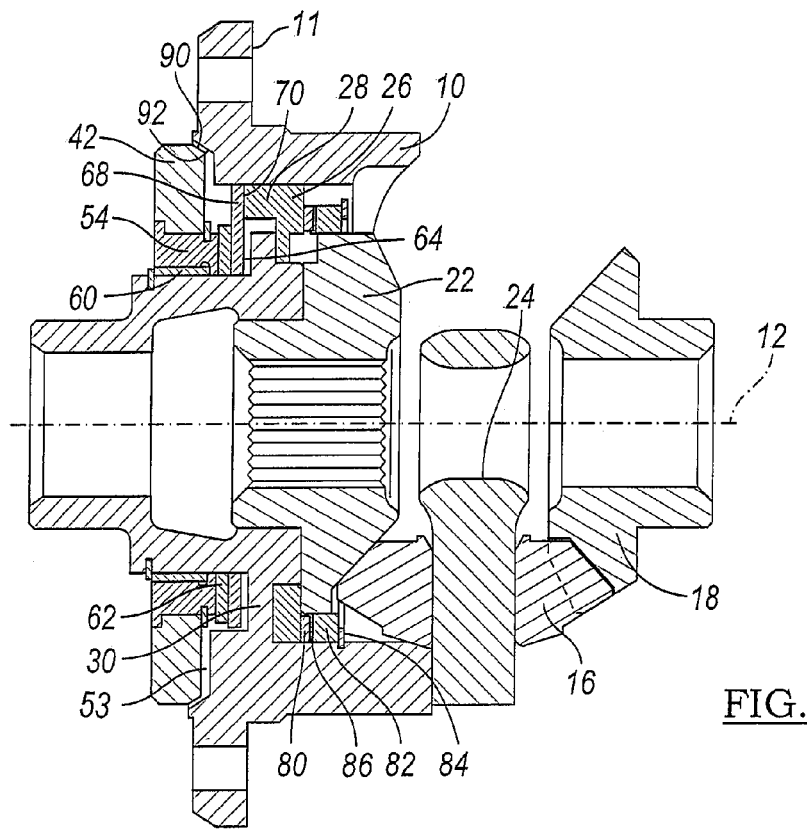
FIG. 9 is a cross section through the case showing the actuators for engaging and disengaging the locking ring and side gear.

Also located in the case 10 is a locking ring 26, secured to the case such that it rotates about axis 12 and moves axially relative to the case along the axis. FIGS. 2, 3 and 9 show that ring 26 is formed with three posts 28, each post extending axially through a hole in web 30, which is formed in the case 10; a planar surface 32 facing the web 30; and a series of clutch teeth 34 and spaces 36 angularly arranged alternately about axis 12 on the axially opposite side of the locking ring from surface 32. The clutch teeth and spaces are adjacent and face the side gear 22.

Figure 4:
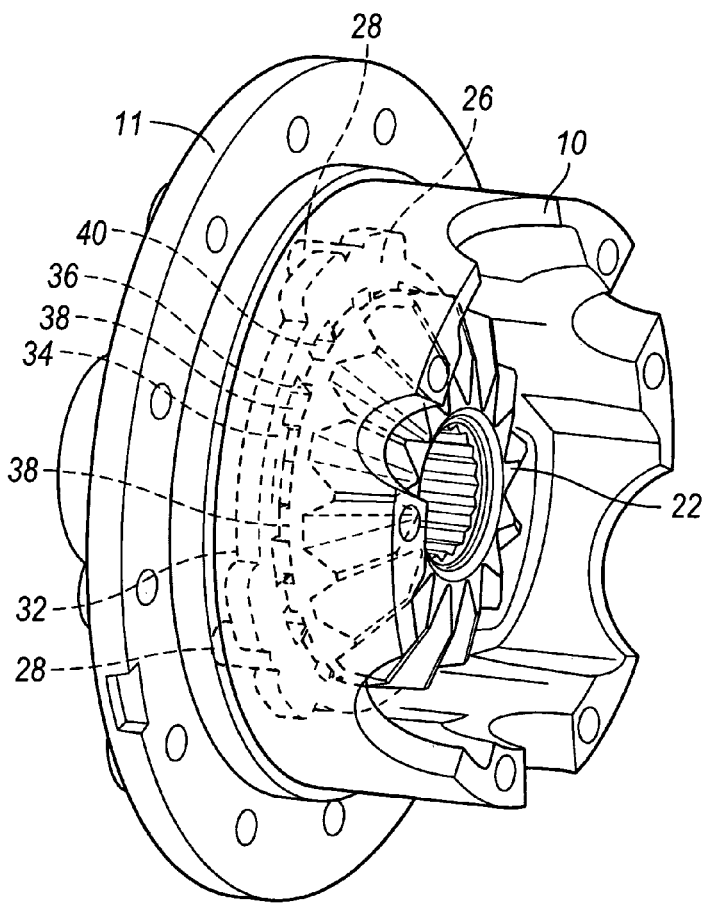
FIG. 4 is an isometric view of the case.
Figure 6:
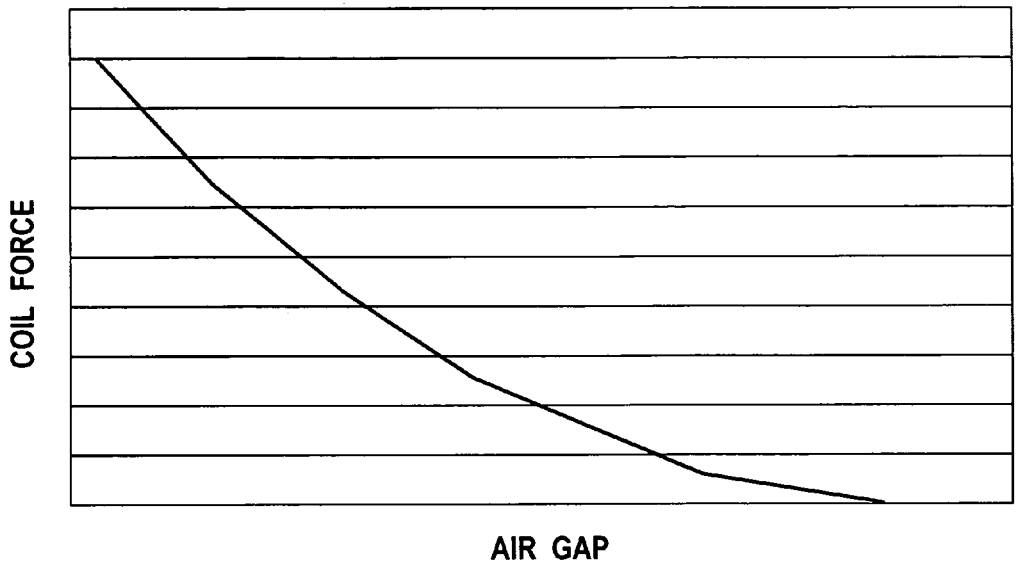
FIG. 6 is a graph showing the variation of magnetic force produced by the coil and an air gap.

FIG. 4 shows that side gear 22 is formed with a series of clutch teeth 38 and spaces 40 angularly arranged alternately about axis 12 on its axial outer face adjacent the clutch teeth 34 and spaces 36 of the locking ring 26. The clutch teeth and spaces of the side gear 22 and locking ring 26 are mutually complementary such that they can engage and disengage as the locking ring moves toward and away from the side gear. The locking ring 26 is normally not engaged with the side gear 22 and permits the side gear to rotate with respect to the differential case 10 and the locking ring, thereby producing an unlocked or disengaged state. When the locking ring 26 is actuated to engage the side gear 22, their clutch teeth and spaces mesh, thereby driveably connecting the side gear to the locking ring and case 10, preventing the side gear from rotating relative to the case and locking ring, and producing a locked or engaged state.

Figure 5:
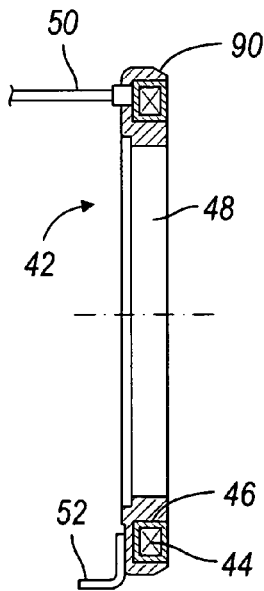
FIG. 5 is a side view of a field core coil assembly.

FIGS. 1 and 5 show a field core coil assembly 42 supported on the case 10 outside the chamber 14. The field assembly 42 includes an electromagnetic coil 44, fitted into an annular recess 46, formed in a ring 48. The coil 44 produces a magnetic field when energized with electric current through the leads 50. The field assembly is secured to the housing by brackets 52, which prevent the coil assembly 42 and coil 44 from rotating. The magnetic field produces an axial force on the coil assembly 42, whose magnitude varies with the width of an air gap 52 between the coil assembly and the case 10.

When the coil 44 is energized, it is attracted to the differential case due to the magnetic field generated by the coil. The coil assembly 42 is fixed against rotation with respect to the differential case 10, but it can translate axially toward and away from the differential case. Axial translation of the coil assembly 42 is transmitted to a sliding collar 54, which is secured to the coil assembly 42 by a press fit and an overlapping rim 58. A bushing 60, which is press fit onto the inside diameter of the sliding collar 54, allows rotation of the case with respect to the sliding collar 54 and coil assembly 42. The bushing 60 also provides a linear guide for the sliding collar 60 and coil assembly 42, allowing them to translate axially.

Figure 7:
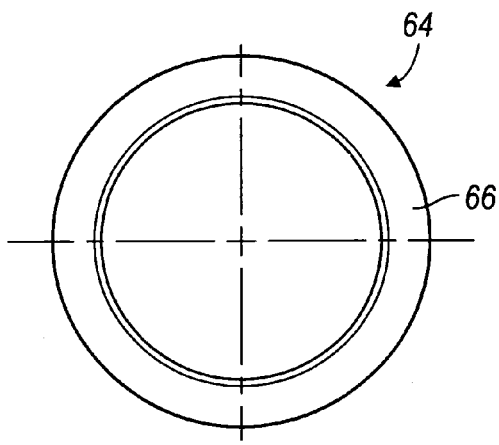
FIG. 7 is a front view of the thrust plate shown in FIG. 1.
Figure 8:
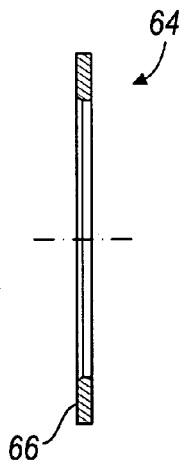
FIG. 8 is a side view of the thrust plate of FIG. 7.

When the coil 44 is energized, the sliding collar 54 applies an axial force directed rightward to a roller thrust bearing 62 and thrust plate or thrust washer 64. Bearing 62 and thrust plate 64 are located in an annular recess formed in the case. Thrust plate 64 applies axial force to the lock ring 26 through the posts 28 on the locking ring. FIGS. 7 and 8 show that the thrust plate 64 is annular. The posts 28 extend through the axial holes in web 30, causing the locking ring 26 to rotate with the case 10 and allowing the locking ring to move axially relative to the case. The post surfaces 70 are located at the left side of the web 30 adjacent the thrust plate lugs 68. FIG. 9 illustrates this alTangement in greater detail.

Figure 10:
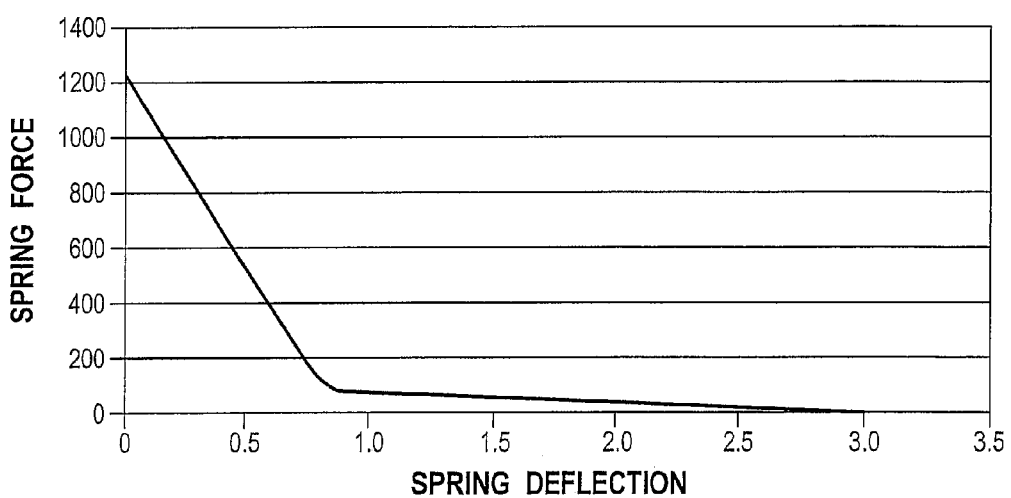
FIG. 10 is a graph showing the variation of the spring force applied to the locking ring and spring deflection.

The locking ring 26 moves into mechanical engagement with the side gear 22 to prevent rotation of the side gear. Springs 80 and 82 are located adjacent to the locking ring 26 and are arranged in series such that spring 80 contacts and applies resilient force to the locking ring, and spring 82 is secured to the case 10 by a snap ring 84 and applies resilient force to spring 80. Preferably springs 80, 82 are wave springs having corrugations directed radially from axis 12 to their radial outer peripheries, the corrugations being formed with alternating radial ridges and grooves. The springs 80, 82 are separated by a flat plate 86, located axially between the springs, such that the ridges of each spring corrugation contact the plate, thereby preventing mutual contact of the springs. The springs continually apply resilient axial force directed leftward to the locking ring 26 to oppose movement of the locking ring toward the locked position with the side gear 22 in response to the magnetic force produced by the coil 44. When the coil culTent is removed, the springs 80, 82 return the locking ring 26 to the disengaged position. The force applied by the springs is sufficient to prevent inadvertent locking of the differential during normal driving conditions when the coil is deenergized. Furthermore, spring 80 has a much lower spring rate than that of spring 82, such that a nonlinear spring force curve is generated, as shown in FIG. 10. The spring arrangement ensures that the spring force is always lower than the force applied to the locking ring 26 by coil assembly 42 when the coil 44 is energized. Since the force produced by the coil assembly 42 when coil 44 is energized is nonlinear, springs 80, 82 are selected so that the magnitude of the spring force applied to the locking ring 76 is less than the force applied by the coil assembly when energized.

FIGS. 1, 5 and 9 show that a beveled surface 90 is formed near the outer diameter of the coil assembly 42, and parallel beveled surface 92 is formed on the differential case 10 adjacent the beveled surface on the coil assembly. When the coil is energized, there must be clearance between the coil and the differential case 10 so that the coil does not contact the rotating differential case. This clearance is established by the measurement between the differential case web and the thrust plate face in the engaged state. This clearance must be less than the clearance between the coil 42 and differential case 10 in the disengaged state.

Figure 11:
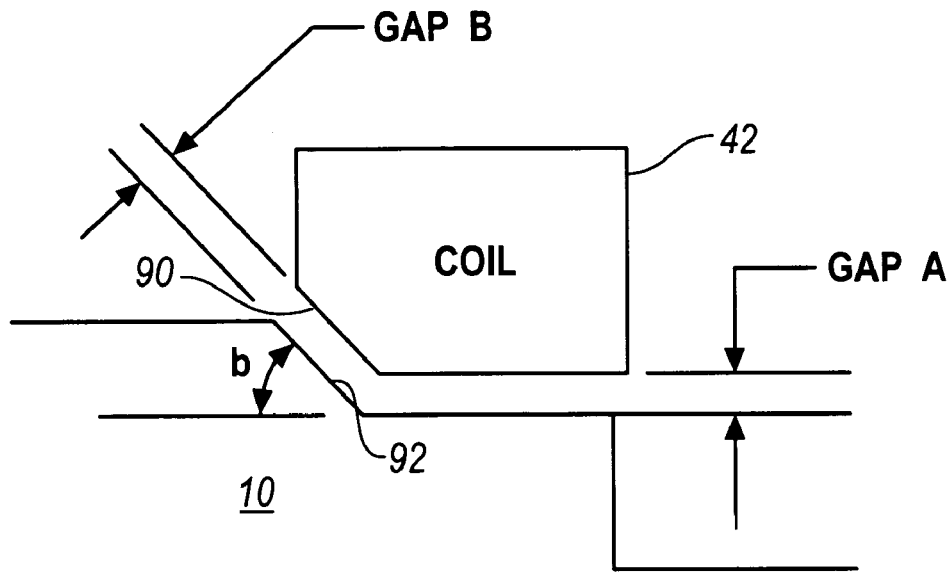
FIG. 11 is a schematic diagram illustrating beveled surfaces on the case and coil assembly, clearance gaps and a bevel angle.

FIG. 11 illustrates beveled surfaces 90, 92, a clearance gap B normal to the beveled surfaces, a clearance gap A parallel to the longitudinal axis 12, and angle b. Gap A varies linearly with axial movement of coil 42, but gap B varies as the product of gap A and cosine b. The beveled surfaces 90, 92 permit gap B initially to be smaller than gap A, and gap B decreases more slowly than gap A after the coil is energized and the coil assembly 42 moves axially in response to the energizing electric culTent applied to the coil. The force produced by energizing the coil is a function of the air gap between the coil and the differential case.

Figure 12:
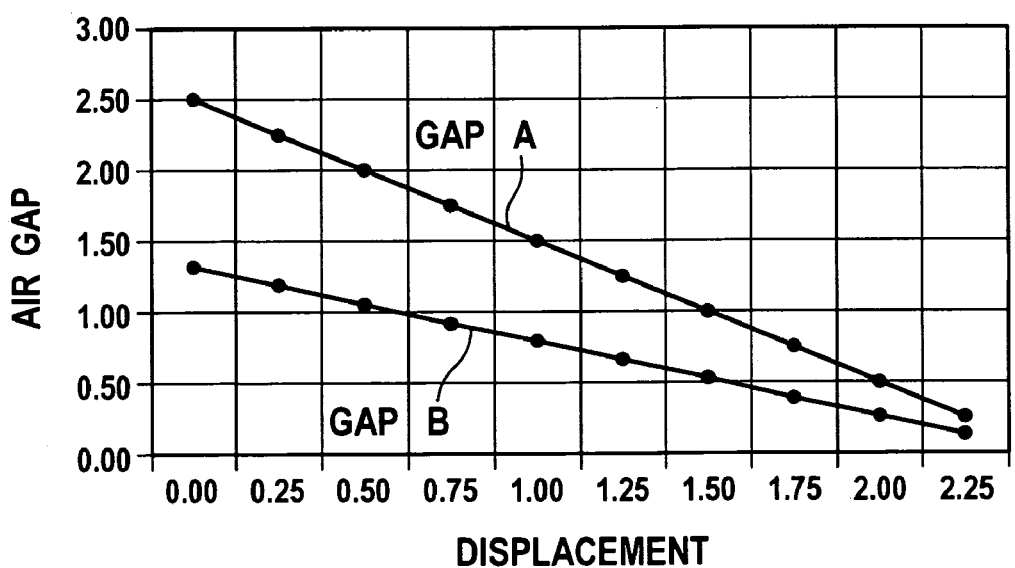
FIG. 12 is a graph showing the variation of the air gap with displacement of the coil.

FIG. 12 shows the variation of the air gap with coil displacement.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A differential mechanism for transmitting power from an input to an output, comprising:
   a case including an outer shell enclosing a cavity, an inner shell spaced radially from the outer shell, and a wall interconnecting the outer shell and the inner shell and formed with a series of angularly spaced holes, each hole extending through the wall from a first side of the wall located within the cavity to a second side of the wall located exterior to the cavity;
   a side gear located in the cavity;
   a locking member formed with a surface located within the cavity that moves alternately into engagement with and disengagement from the side gear, and posts secured to the surface and engaging the wall for rotation therewith, each post extending through one of the holes to the exterior of the cavity and;
   a first actuator including an electromagnetic coil located outside the cavity, the first actuator contacting the locking member posts at the second side of the wall and moving the locking member toward and into engagement with the side gear in response to energizing the coil; and
   a second actuator located within the cavity and urging the locking member away from engagement with the side gear.

2. The differential mechanism of claim 1, wherein:
   the side gear includes a first engagement surface; and
   the locking member includes a second engagement surface for engaging the first engagement surface to limit rotation of the side gear relative to the case, and for disengaging the first engagement surface to permit rotation of the side gear relative to the case.

3. The differential mechanism of claim 1, wherein the first actuator includes:
   a collar supported on the case for axial movement toward the locking member, and secured to the coil for axial movement therewith;
   a thrust plate contacting the locking member and axially displaceable by the collar toward the locking member in response to energizing the coil.

4. The differential mechanism of claim 1, wherein the first actuator includes:
   a collar supported on the case for axial movement toward the locking member, and secured to the coil for axial movement therewith;
   a thrust plate contacting the locking member and axially displaceable by the collar toward the locking member in response to energizing the coil; and
   a thrust bearing located axially between the collar and thrust plate, for transmitting axial force between the collar and thrust plate and permitting the thrust plate to rotate relative to the collar.

5. The differential mechanism of claim 1 wherein:
   the side gear includes first clutch teeth located within the cavity;
   the locking member includes second clutch teeth engageable with the first clutch teeth; and
   the first actuator further includes:
   a collar located on the second side of the wall, supported on the case for axial movement toward the locking member, and secured to the coil for axial movement therewith;
   a thrust plate located on the second side of the wall, contacting at least one of the posts and axially displaceable by the collar toward the locking member in response to energizing the coil; and
   a thrust bearing located axially between the collar and thrust plate on the second side of the wall, for transmitting axial force between the collar and thrust plate and permitting the thrust plate to rotate relative to the collar.

6. The differential mechanism of claim 1, wherein the second actuator includes a spring that urges the locking member into contact with the first actuator.

7. The differential mechanism of claim 1, wherein the second actuator includes:
   a first wave spring contacting the locking member;
   a second wave spring secured against axial movement relative to the case; and
   a plate located axially between and contacting the first spring and the second spring.

8. A differential mechanism for transmitting power to an output shaft, comprising:
   a case including an outer shell enclosing a cavity, an inner shell spaced radially from the outer shell, and a wall interconnecting the outer shell and the inner shell and formed with a series of angularly spaced holes, each hole extending through the wall from a first side of the wall located within the cavity to a second side of the wall located exterior to the cavity;
   a side gear located in the case, supported for rotation, and including first clutch teeth;
   a locking member including second clutch teeth located within the cavity and that move alternately into engagement with and disengagement from the first clutch teeth of the side gear, and posts engaging the wall for rotation therewith, each post extending through one of the holes to the exterior of the cavity and;
   a first actuator including an electromagnetic coil, and including a surface contacting a portion of the posts located at the second side of the wall and exterior to the cavity, for moving the second clutch teeth toward engagement with the first clutch teeth in response to energizing the coil; and
   a second actuator located on first side of the wall within the cavity for urging the second clutch teeth away from engagement with the first clutch teeth.

9. The differential mechanism of claim 8, wherein the first actuator includes:
   a collar supported on the case for movement toward the locking member, and secured to the coil for movement therewith;
   a thrust plate contacting the locking member and displaceable by the collar toward the locking member in response to energizing the coil.

10. The differential mechanism of claim 8, wherein the first actuator includes:
    a collar supported on the case for axial movement toward the locking member, and secured to the coil for movement therewith;
    a thrust plate contacting the locking member and displaceable by the collar toward the locking member in response to energizing the coil; and
    a thrust bearing located between the collar and thrust plate, for transmitting axial force between the collar and thrust plate and permitting the thrust plate to rotate relative to the collar.

11. The differential mechanism of claim 8 wherein:
    the first actuator further includes:

a collar located on the second side of the wall, supported on the case for axial movement toward the locking member, and secured to the coil for axial movement therewith;

a thrust plate located on the second side of the wall, contacting the post and axially displaceable by the collar toward the locking member in response to energizing the coil; and a thrust bearing located axially between the collar and thrust plate on the second side of the wall, for transmitting axial force between the collar and thrust plate and permitting the thrust plate to rotate relative to the collar.

12. The differential mechanism of claim 8, wherein the second actuator includes a spring located in the cavity that urges the locking member into contact with the first actuator.

13. The differential mechanism of claim 8, wherein the second actuator includes:

a first wave spring contacting the locking member;

a second wave spring secured against axial movement relative to the case; and a plate located axially between and contacting the first spring and the second spring.

14. The differential mechanism of claim 8, wherein:

said engagement of the first clutch teeth and the second clutch teeth limits rotation of the side gear relative to the case, and disengagement of the first clutch teeth and the second clutch teeth permits rotation of the side gear relative to the case.

15. The differential mechanism of claim 8, wherein:

the case includes a beveled surface facing the electromagnetic coil; and the electromagnetic coil includes a beveled surface spaced from and facing the beveled surface of the case.

* * * * *